United States Patent
Komori et al.

(10) Patent No.: US 9,061,933 B2
(45) Date of Patent: Jun. 23, 2015

(54) METHOD OF PRODUCING TEMPERED GLASS SHEET

(75) Inventors: Hiroshi Komori, Shiga (JP); Masahiro Tomamoto, Shiga (JP); Yoshinari Kato, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 234 days.

(21) Appl. No.: 13/590,254

(22) Filed: Aug. 21, 2012

(65) Prior Publication Data

US 2013/0071666 A1   Mar. 21, 2013

(30) Foreign Application Priority Data

Aug. 21, 2011   (JP) .................................. 2011-180028

(51) Int. Cl.
| | | |
|---|---|---|
| *C03B 27/012* | (2006.01) | |
| *B32B 33/00* | (2006.01) | |
| *C03C 23/00* | (2006.01) | |

(52) U.S. Cl.
CPC .............. *C03B 27/012* (2013.01); *B32B 33/00* (2013.01); *Y10T 428/315* (2015.01); *C03C 23/007* (2013.01)

(58) Field of Classification Search
None
See application file for complete search history.

(56) References Cited

U.S. PATENT DOCUMENTS

| 2,881,566 | A | * | 4/1959 | Badger ......................... 65/30.1 |
| 3,460,927 | A | * | 8/1969 | La Due et al. ............... 65/30.14 |
| 2007/0166538 | A1 | * | 7/2007 | Jensen .......................... 428/375 |
| 2009/0133441 | A1 | * | 5/2009 | Ellison .............................. 65/90 |
| 2010/0197477 | A1 | * | 8/2010 | Ellison ............................ 501/53 |
| 2011/0159219 | A1 | * | 6/2011 | Yue et al. ..................... 428/34.4 |

FOREIGN PATENT DOCUMENTS

| JP | 41-20629 | 12/1966 |
| JP | 47-49298 | 12/1972 |

OTHER PUBLICATIONS

Deriano et al., "Mechanical strength improvement of a soda-lime-silica glass by thermal treatment under flowing gas," Journal of the European Ceramic Society, 24 (2004) 2803-2812.*

* cited by examiner

*Primary Examiner* — David Sample

(74) *Attorney, Agent, or Firm* — Wenderoth, Lind & Ponack, L.L.P.

(57) ABSTRACT

Provided is a method of producing a tempered glass sheet, comprising applying tempering treatment to a glass sheet by increasing the content of $SiO_2$ in terms of mass in a surface region of a glass sheet through application of thermal treatment to the glass sheet to 1.03 or more times that in an interior region positioned at a depth of 1 μm from a surface of the glass sheet.

3 Claims, No Drawings

METHOD OF PRODUCING TEMPERED GLASS SHEET

TECHNICAL FIELD

The present invention relates to a method of producing a tempered glass sheet, and more specifically, to a method of applying tempering treatment to a glass sheet by increasing a content of $SiO_2$ in a surface region of the glass sheet in comparison to that in an interior region thereof.

BACKGROUND ART

A glass sheet is a brittle material, and hence, when the glass sheet merely comes into slight contact with a different member in a processing process, a transportation process, or the like, a minute crack may be produced or the glass sheet may break. In particular, a glass sheet used in a touch panel display or the like in recent years loses its function necessary for a product when even a slight crack is produced in its surfaces. Thus, it is very important to produce a glass sheet which has high crack resistance and resists the occurrence of a flaw.

PRIOR ART DOCUMENTS

Patent Documents

[Patent Document 1] Japanese Examined Patent Publication No. Sho 47-49298
[Patent Document 2] Japanese Examined Patent Publication No. Sho 41-20629

SUMMARY OF THE INVENTION

Problem to be Solved by the Invention

Patent Documents 1 and 2 each describe a method of applying tempering treatment to a glass sheet by carrying out ion exchange. This method is a method involving introducing alkali ions each having a large ion radius into a glass sheet by carrying out ion exchange at a temperature which is equal to or lower than the strain point of the glass sheet. According to this method, tempering treatment can be successfully applied even to a glass sheet having a thin thickness.

However, this method is a method involving immersing a glass sheet in, for example, a potassium nitrate molten salt and applying thermal treatment thereto. Thus, when this method is used, energy efficiency reduces and the treatment process of the method becomes complicated, possibly resulting in the surge of the production cost of the tempered glass sheet. Further, this method uses a glass sheet containing a large amount of alkali components, and hence is unsuitable for the tempering treatment of an alkali-free or low alkali glass sheet.

Thus, a technical object of the present invention is to invent a method which can be used for applying tempering treatment to a glass sheet (in particular, an alkali-free or low alkali glass sheet) without significantly increasing the production cost.

Means for Solving the Problem

The inventors of the present invention have made intensive studies. As a result, the inventors have found that the technical object can be attained by increasing the content of $SiO_2$ in a surface region of a glass sheet in comparison to that in an interior region thereof through the application of thermal treatment to the glass sheet, and propose the finding as the present invention. That is, a method of producing a tempered glass sheet according to the present invention comprises tempering a glass sheet by increasing the content of $SiO_2$ in terms of mass in a surface region of a glass sheet through thermal treatment to 1.03 or more times that in an interior region positioned at a depth of 1 μm from a surface of the glass sheet.

A glass sheet generally has a network structure of Si and O. When an alkaline-earth ion, an alkali ion, or the like enters a gap in this network structure, a non-bridging oxygen atom is present, resulting in the occurrence of a disconnection part in the network structure. When predetermined thermal treatment is applied to the glass sheet in the state described above, an alkaline-earth component, an alkali component, or the like volatilizes from a surface layer of the glass sheet, and the surface region of the glass sheet turns to a state in which a cavity is present in the gap in the network structure, that is, an $SiO_2$-rich state. When the surface region of the glass sheet is in the $SiO_2$-rich state, flexibility is imparted to the network structure in the surface region of the glass sheet, and high density formation in the glass sheet functions strongly to external pressure such as pushing with a pen or the like, resulting in the occurrence of a smaller stress therein and the improvement of the crack resistance thereof. The inventors of the present invention have made various examinations, and have consequently clarified that, when the content of $SiO_2$ in terms of mass in the surface region of a glass sheet is increased to 1.03 or more times that in the interior region positioned at a depth of 1 μm from the surface of the glass sheet, the mechanical strength of the glass sheet remarkably improves.

Second, in the method of producing a tempered glass sheet according to the present invention, the thermal treatment is preferably applied at a temperature of 800 to 1,000° C.

Third, a tempered glass sheet of the present invention is manufactured by the above-mentioned method of producing a tempered glass sheet.

Fourth, the tempered glass sheet of the present invention preferably has an unpolished surface.

Fifth, the tempered glass sheet of the present invention is preferably substantially free of alkali metal oxides. Here, the phrase "substantially free of alkali metal oxides" refers to the case where the content of alkali metal oxides ($Li_2O$, $Na_2O$, and $K_2O$) is less than 0.1 mass %.

Effects of the Invention

The method of producing a tempered glass sheet according to the present invention utilizes the volatilization action of glass components caused by thermal treatment. Thus, thermal treatment can be carried out successively after formation of a glass sheet, the production process can be simplified, and proper tempering treatment can be applied even to an alkali-free or low alkali glass sheet.

MODES FOR CARRYING OUT THE INVENTION

In a method of producing a tempered glass sheet according to the present invention, the content of $SiO_2$ in terms of mass in a surface region of a glass sheet is 1.03 or more times, preferably 1.05 or more times, 1.07 or more times, particularly preferably 1.10 or more times that in an interior region positioned at a depth of 1 μm from a surface of the glass sheet. When the content of $SiO_2$ in the surface region of the glass sheet is out of the above-mentioned ranges, it is difficult to enhance the mechanical strength of the glass sheet.

In the method of producing a tempered glass sheet according to the present invention, the temperature of thermal treatment is preferably 800 to 1,000° C., particularly preferably 880 to 970° C. With this, the content of $SiO_2$ in the surface region of the glass sheet is easily increased while improper deformation of the glass sheet is suppressed.

The time period of the thermal treatment is preferably 30 seconds to 5 hours, 5 minutes to 3 hours, particularly preferably 30 minutes to two and half hours. With this, the content of $SiO_2$ in the surface region of the glass sheet is easily increased without reducing production efficiency.

In the method of producing a tempered glass sheet according to the present invention, the thermal treatment is preferably performed in a step separate from formation of a glass sheet in order to control strictly the content of $SiO_2$ in the surface region of the glass sheet. On the other hand, when the production efficiency is taken into consideration, the thermal treatment is preferably performed successively after formation of a glass sheet. Note that the thermal treatment may be performed simultaneously with formation of a glass sheet. In the present invention, such aspect is not completely excluded, but when the thermal treatment is performed at the time of forming a glass sheet, it may be difficult to control the dimensions of the glass sheet.

As described above, the method of producing a tempered glass sheet according to the present invention allows proper tempering treatment to be applied even to an alkali-free or low alkali glass sheet. Note that, when the glass sheet comprises alkali components, tempering treatment through ion exchange may also be carried out after the tempering treatment according to the present invention.

The alkali-free glass sheet, in particular, preferably comprises, as a glass composition in terms of mass %, 50 to 70% of $SiO_2$, 10 to 25% of $Al_2O_3$, 3 to 20% of $B_2O_3$, 0 to 10% of MgO, 3 to 15% of CaO, 0 to 10% of BaO, and 0 to 10% of SrO. The reasons why the content of each component is limited as described above are mentioned below.

The content of $SiO_2$ is preferably 50 to 70%. When the content of $SiO_2$ is less than 50% in glass, its chemical resistance, in particular, its acid resistance deteriorates, and it is difficult to reduce the density thereof. On the other hand, when the content of $SiO_2$ is more than 70% in glass, the viscosity thereof increases, the meltability thereof deteriorates, and a defect due to a devitrified foreign substance (cristobalite) is liable to occur in the glass. The content of $SiO_2$ is preferably 58% or more, 60% or more, particularly preferably 62% or more, and is preferably 68% or less, particularly preferably 66% or less.

The content of $Al_2O_3$ is preferably 10 to 25%. When the content of $Al_2O_3$ is less than 10% in glass, it is difficult to increase the strain point thereof. Further, $Al_2O_3$ has the function of improving the Young's modulus of glass, thereby increasing the specific Young's modulus thereof, and when the content of $Al_2O_3$ is less than 10% in glass, the Young's modulus thereof is liable to decrease. The content of $Al_2O_3$ is preferably 12% or more, particularly preferably 14.5% or more, and is preferably 19% or less, particularly preferably 18.0% or less. Note that, when the content of $Al_2O_3$ is more than 19% in glass, the liquidus temperature thereof increases and the denitrification resistance thereof is liable to deteriorate.

$B_2O_3$ is a component that works as a melting accelerate component, reduces the viscosity of glass, and improves the meltability thereof. Further, as the content of $B_2O_3$ is larger in a glass sheet, the content of $SiO_2$ is more easily increased in the surface region of the glass sheet. On the other hand, as the content of $B_2O_3$ is larger in a glass sheet, the acid resistance thereof tends to deteriorate, even though a glass sheet to be used in a liquid crystal display or the like is required to have high acid resistance. Thus, the content of $B_2O_3$ is preferably 3 to 20%. When the content of $B_2O_3$ is less than 3% in glass, $B_2O_3$ works insufficiently as a melting accelerate component, and the buffered hydrofluoric acid resistance thereof is liable to deteriorate. On the other hand, when the content of $B_2O_3$ is more than 20% in glass, the strain point and heat resistance thereof are liable to deteriorate, and the acid resistance thereof is liable to deteriorate. Moreover, the Young's modulus thereof decreases and the specific Young's modulus thereof is liable to decrease. The content of $B_2O_3$ is preferably 5% or more, 8.6% or more, particularly preferably 9.5% or more, and is preferably 15% or less, 14% or less, particularly preferably 12% or less.

The content of MgO is preferably 0 to 10%. MgO is a component that reduces the viscosity of glass and improves the meltability thereof without decreasing the strain point thereof. Further, MgO has the most significant effect of reducing the density of glass among alkaline earth metal oxides. However, when MgO is added in a large amount in glass, the liquidus temperature thereof rises and the denitrification resistance thereof is liable to deteriorate. Besides, MgO in a glass sheet may react with buffered hydrofluoric acid, forming a product, and the product may be fixed onto devices on a surface of the glass sheet or may attach onto the glass sheet, resulting in a cloudy glass sheet. Thus, the content of MgO is preferably limited to a certain extent, and the content of MgO is preferably 0 to 2%, 0 to 1%, particularly preferably 0 to 0.5%.

CaO also is a component that reduces the viscosity of glass and remarkably improves the meltability thereof without decreasing the strain point thereof as is the case with MgO. The content of CaO is preferably 3 to 15%. In order to supply a glass sheet having a high quality at lost cost by using low alkali or alkali-free glass, it is important to enhance the meltability of the low alkali or alkali-free glass. It is the most effective method to reduce the content of $SiO_2$ in the glass composition as a method of enhancing the meltability. When the content of $SiO_2$ is reduced in glass, the acid resistance thereof may extremely deteriorate and the density and thermal expansion coefficient thereof may increase. Thus, the content of CaO in glass is preferably 3% or more from the viewpoint of enhancing the meltability thereof. On the other hand, when the content of CaO is more than 15% in a glass sheet, the buffered hydrofluoric acid resistance thereof deteriorates, with the result that the surfaces of the glass sheet are liable to be eroded, and the reaction product may attach onto the surfaces of the glass sheet, resulting in a cloudy glass sheet. The content of CaO is preferably 4% or more, 5% or more, particularly preferably 6% or more, and is preferably 12% or less, 10% or less, particularly preferably 9% or less.

BaO is a component that enhances the chemical resistance and devitrification resistance of glass. On the other hand, BaO is a component that significantly increases the density and thermal expansion coefficient of glass. Further, it is not preferred from the environmental point of view that BaO be contained in a large amount. Thus, the content of BaO is desirably 10% or less, 5% or less, 2% or less, particularly desirably 1% or less.

SrO is a component that enhances the chemical resistance and devitrification resistance of glass. The content of SrO is preferably 0 to 10%. On the other hand, SrO is a component that increases the density and thermal expansion coefficient of glass. Thus, the content of SrO is preferably 4% or less, 2.7% or less, particularly preferably 1.5% or less.

In addition to the above-mentioned components, the following components may be added.

ZnO is a component that improves the buffered hydrofluoric acid resistance of glass and improves the meltability thereof. However, if ZnO is added in glass in a large amount, the glass is liable to denitrify, the strain point thereof decreases, and the density thereof is liable to increase. Thus, the content of ZnO is preferably 0 to 10%, 0 to 7%, 0 to 5%, 0 to 3%, particularly preferably 0 to 0.5%.

$TiO_2$ is a component that improves the chemical resistance of glass, in particular, acid resistance of glass, reduces the viscosity thereof, and enhances the meltability thereof. However, if $TiO_2$ is added in glass in a large amount, the resultant glass sheet may be colored. Thus, the content of $TiO_2$ is preferably 0 to 5%, 0 to 3%, particularly preferably 0 to 1%.

$P_2O_5$ is a component that enhances the denitrification resistance of glass. However, if $P_2O_5$ is added in glass in a large amount, the resultant glass sheet may have phase separation and become opaline, and the acid resistance of the glass sheet may remarkably deteriorate. Thus, the content of $P_2O_5$ is preferably 0 to 5%, 0 to 3%, particularly preferably 0 to 1%.

In addition, each of $Y_2O_3$, $Nb_2O_5$, and $La_2O_3$ may be added at up to about 3%. These components have the function of increasing the strain point, Young's modulus, and the like of glass, but if any of them is added in glass in a large amount, the density of the glass may increase. Besides, $As_2O_3$, $Sb_2O_3$, F, Cl, $SO_3$, C, metal powder (such as metal powder of Al and Si), and the like may each be added as a fining agent in glass at up to 2%, as long as the agent does not impair the characteristics of the glass. Moreover, $CeO_2$, $Fe_2O_3$, and the like may each be added as a fining agent at up to 1%. Note that it is desirable that $As_2O_3$ be not used from the environmental point of view.

The glass sheet according to the present invention can be produced by placing a glass material which is prepared to have a predesired glass composition in a continuous melting furnace, melting the glass material by heating at 1,500 to 1,650° C., fining the resultant, feeding the resultant to a forming apparatus, forming the molten glass into a sheet shape, and subjecting the glass to thermal treatment.

A method of forming the glass sheet is not particularly limited. It is possible to use a roll forming method, a float forming method, an up-draw forming method, a slot down-draw forming method, an overflow down-draw forming method, a redraw forming method, or the like. Of those, an overflow down-draw method is preferred as the forming method. This is because, when the overflow down-draw method is used, the surfaces of molten glass which should serve as the surfaces of the resultant glass sheet do not come into contact with a trough-shaped refractory and are formed into the surfaces of the glass sheet while maintaining the state of a free surface, thus providing a glass sheet having a good surface quality even when its surfaces are not polished.

A tempered glass sheet of the present invention is characterized by being manufactured by the above-mentioned method of producing a tempered glass sheet. Here, the technical features of the tempered glass sheet of the present invention are the same as those of the above-mentioned method of producing a tempered glass sheet.

The tempered glass sheet of the present invention preferably has an unpolished surface. The average surface roughness (Ra) of the unpolished surface is preferably 10 Å or less, more preferably 5 Å or less, still more preferably 4 Å or less, still more preferably 3 Å or less, most preferably 2 Å or less. Note that it is recommended to measure the average surface roughness (Ra) of a surface by a method in accordance with SEMI D7-97 "FPD glass substrate surface roughness measurement method." Although the theoretical strength of glass is inherently very high, glass is broken even with much lower stress than the theoretical strength in many cases. This is because a small defect called "Griffith flow" is produced in the step after the forming of the glass sheet, for example, in the polishing step. Thus, when the surface of the tempered glass sheet is unpolished, the inherent mechanical strength of the glass is maintained, and the tempered glass sheet is hardly broken. Further, when the surface of the tempered glass sheet is unpolished, the polishing step can be eliminated from the process of producing the glass sheet, thereby making it possible to reduce the production cost of the tempered glass sheet. When both the surfaces of the tempered glass sheet of the present invention are entirely unpolished, the tempered glass sheet is even more hardly broken. Further, to prevent breakage from the cut surface of the tempered glass sheet, the cut surface may be chamfered or subjected to etching, for example. Note that an unpolished surface of the glass can be obtained when forming of the glass sheet is carried out by the overflow down-draw method.

EXAMPLES

Hereinafter, examples of the present invention are described. Note that the following examples are merely shown for illustrative purposes. The present invention is by no means limited to the following examples.

Table 1 shows examples (Sample Nos. 1 to 4) and comparative examples (Sample Nos. 5 and 6) of the present invention.

Table 2 shows the glass composition of each glass sheet used in the experiments described in Table 1.

TABLE 1

|  | Example | | | | Comparative Example | |
|---|---|---|---|---|---|---|
|  | No. 1 | No. 2 | No. 3 | No. 4 | No. 5 | No. 6 |
| Glass sheet | A | A | B | B | A | B |
| Thermal treatment conditions Temperature (° C.) | 900 | 950 | 950 | 950 | — | — |
| Thermal treatment conditions Time (hr.) | 1 | 1 | 1 | 2 | — | — |
| Mass ratio of $SiO_2$ surface layer/interior region positioned at depth of 1 μm from surface layer | 1.05 | 1.07 | 1.06 | 1.10 | 1.02 | 1.02 |
| Crack resistance (g) | 2,800 | 3,500 | 3,200 | 4,000 | 1,800 | 1,500 |

TABLE 2

|  |  | A | B |
|---|---|---|---|
| Glass composition (mass %) | $SiO_2$ | 64 | 60 |
|  | $Al_2O_3$ | 16 | 16 |
|  | $B_2O_3$ | 10 | 10 |
|  | MgO | — | 0.3 |
|  | CaO | 7 | 8 |
|  | SrO | 1 | 5 |
|  | BaO | 1 | 0.5 |
|  | $Sb_2O_3$ | 0.9 | — |
|  | $SnO_2$ | 0.1 | 0.2 |

Each sample was prepared as follows. First, glass sheets each having the glass composition (A or B) described in Table 2 were prepared. Next, the glass sheets were each subjected to thermal treatment under the conditions described in Table 1, yielding the glass sheets of Sample Nos. 1 to 4. Note that Sample Nos. 5 and 6 were prepared without the predetermined thermal treatment (note that a slight amount of components volatilized at the time of melting). Subsequently, the mass ratio of $SiO_2$ in each sample and the crack resistance thereof were evaluated. Table 1 shows the results.

The mass ratio of $SiO_2$ described in Table 1 shows the ratio of the $SiO_2$ content in a surface region to that in an interior region positioned at a depth of 1 μm. Further, the mass ratio of $SiO_2$ in Table 1 shows values measured by a glow discharge optical emission spectrometry.

The crack resistance described in Table 1 shows values measured in accordance with a method proposed by Wada et al. (see, if necessary, M. Wada et al. Proc., the Xth ICG, vol. 11, Ceram. Soc., Japan, Kyoto, 1974, p. 39). Specifically, a tempered glass sheet is placed on a stage of a Vickers hardness tester, and a predetermined rhombic diamond indenter is pressed against the surface of the tempered glass sheet under a predetermined load for 15 seconds. Next, within 15 seconds after the removal of the load, the number of the cracks occurring from the four corners of the indenter mark is counted. Finally, the ratio of the number of the cracks counted as described above to the maximum number (four) of cracks that can occur is calculated, and the ratio is defined as a crack occurrence ratio. The value of the load which is applied when the crack occurrence ratio is 50% is defined as "crack resistance." Note that the crack occurrence ratio was obtained by calculating the average value of the measurement values of 20 tests performed under the same load. Further, the measurements were carried out under the conditions of a temperature of 25° C. and a humidity of 30%. Here, the results show that, as the crack resistance of a tempered glass sheet is larger, cracks are difficult to occur therein under a higher load, that is, the tempered glass sheet has excellent cracking resistance.

As evident from Table 1, each of Sample Nos. 1 to 4 had a content of $SiO_2$ in a surface region 1.03 or more times as high as that in an interior region positioned at a depth of 1 μm, and hence had a crack resistance of 2,800 g or more.

On the other hand, each of Sample Nos. 5 and 6 had a content of $SiO_2$ in a surface region 1.02 times as high as that in an interior region positioned at a depth of 1 μm, and hence had a crack resistance of 1,800 g or less.

INDUSTRIAL APPLICABILITY

The tempered glass sheet of the present invention is suitably used as cover glasses for a mobile phone, a digital camera, a PDA, a solar cell, and the like, or substrates for a touch panel display. Further, the tempered glass sheet of the present invention can be expected to find applications requiring a high mechanical strength, for example, window glasses, substrates for a magnetic disk, substrates for a flat panel display, cover glasses for a solid-state imaging device, and tableware, in addition to the above-mentioned applications.

The invention claimed is:

1. A method of producing a tempered glass sheet, comprising:
   forming a glass sheet having, as a glass composition in terms of mass %, 50% to 68% of $SiO_2$, 10% to 25% of $Al_2O_3$, 3% to 20% of $B_2O_3$, 0% to 10% of MgO, 3% to 15% of CaO, 0% to 10% of BaO, and 0% to 10% of SrO; and
   tempering the formed glass sheet by increasing a content of $SiO_2$ in terms of mass in a surface region of the glass sheet by volatilizing glass components through a thermal treatment which is carried out successively after forming the glass sheet to 1.03 or more times that in an interior region positioned at a depth of 1 μm from a surface of the glass sheet,
   wherein the thermal treatment consists of heating the glass sheet at a temperature of 800 to 1,000° C. for 30 seconds to 5 hours.

2. The method according to claim 1, wherein the tempered glass sheet has an unpolished surface.

3. The method according to claim 1, wherein the tempered glass sheet is substantially free of alkali metal oxides.

* * * * *